US012365486B2

(12) United States Patent
Smith

(10) Patent No.: US 12,365,486 B2
(45) Date of Patent: Jul. 22, 2025

(54) EMULATOR

(71) Applicant: AIRBUS OPERATIONS LIMITED, Bristol (GB)

(72) Inventor: Steven Paul Smith, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 212 days.

(21) Appl. No.: 17/970,218

(22) Filed: Oct. 20, 2022

(65) Prior Publication Data

US 2023/0131385 A1   Apr. 27, 2023

(30) Foreign Application Priority Data

Oct. 27, 2021 (GB) ...................................... 2115447

(51) Int. Cl.
*B64F 5/60* (2017.01)
*B25J 9/16* (2006.01)
*B64F 5/10* (2017.01)
*G05B 19/418* (2006.01)

(52) U.S. Cl.
CPC .......... *B64F 5/60* (2017.01); *G05B 19/41885* (2013.01); *B25J 9/1671* (2013.01); *B64F 5/10* (2017.01)

(58) Field of Classification Search
CPC ............ B64F 5/10; G05B 2219/32385; G05B 19/41885; B25J 9/1671
See application file for complete search history.

(56) References Cited

U.S. PATENT DOCUMENTS

| | | | | |
|---|---|---|---|---|
| 4,945,488 A | * | 7/1990 | Carver | G05B 19/41805 700/182 |
| 2011/0200245 A1 | * | 8/2011 | Crothers | G05B 19/4183 382/141 |
| 2013/0066612 A1 | | 3/2013 | Russell | |
| 2014/0148949 A1 | * | 5/2014 | Graca | B25J 9/1682 700/248 |
| 2014/0343918 A1 | | 11/2014 | Grgic et al. | |
| 2015/0224614 A1 | * | 8/2015 | Ferenczi | B64F 5/10 29/791 |

(Continued)

FOREIGN PATENT DOCUMENTS

| | | |
|---|---|---|
| CN | 104309814 | 1/2015 |
| EP | 2 804 058 | 11/2014 |
| EP | 3 196 718 | 7/2017 |

OTHER PUBLICATIONS

Combined Search and Examination Report for GB2115447.1, dated Jun. 15, 2022, 9 pages.

(Continued)

*Primary Examiner* — Michael W Hotchkiss
(74) *Attorney, Agent, or Firm* — Nixon & Vanderhye P.C.

(57) ABSTRACT

An emulator configured to emulate an automated aircraft assembly jig supporting an aircraft assembly is disclosed. The emulator connectable to an automated equipment module and configured to: send a first signal to an automated equipment module, wherein the first signal is representative of a communication to the automated equipment module; and receive a second signal from the automated equipment module representative of a communication from the automated equipment module, wherein the automated equipment module is arranged to operate autonomously on an aircraft assembly.

21 Claims, 9 Drawing Sheets

(56) References Cited

U.S. PATENT DOCUMENTS

| | | | |
|---|---|---|---|
| 2015/0314889 A1* | 11/2015 | Day ........................... | B64F 5/10 |
| | | | 408/69 |
| 2016/0033962 A1* | 2/2016 | Cote ............... | G05B 19/41885 |
| | | | 700/29 |
| 2017/0120447 A1* | 5/2017 | Inoue ..................... | B25J 9/1671 |
| 2017/0232614 A1* | 8/2017 | Takeda .................. | B25J 9/1676 |
| | | | 703/7 |
| 2020/0047344 A1* | 2/2020 | Kinugasa ........... | G01D 5/24466 |
| 2020/0353621 A1* | 11/2020 | Li ........................... | B25J 9/163 |
| 2021/0171181 A1* | 6/2021 | Hirai ......................... | B64C 1/12 |
| 2022/0063097 A1* | 3/2022 | Szabó .................... | B25J 9/1664 |
| 2022/0203535 A1* | 6/2022 | Bai ........................ | B25J 9/1671 |
| 2024/0139952 A1* | 5/2024 | Yoneyama ............. | B25J 9/1671 |

OTHER PUBLICATIONS

Extended European Search Report for Application No. 22201458.1, seven pages, dated Mar. 7, 2023.

\* cited by examiner

EMULATOR

CROSS RELATED APPLICATION

This application claims priority to United Kingdom Patent Application GB 2115447.1 filed Oct. 27, 2021, the entire contents of which is hereby incorporated by reference.

FIELD OF THE INVENTION

The present invention relates to an emulator configured to emulate an automated aircraft assembly jig supporting an aircraft assembly, an emulator system, a method of validating an automated equipment module for connecting to an automated aircraft assembly jig, and a method of operating an automated equipment module.

BACKGROUND OF THE INVENTION

The assembly of large structures, such as aircraft, typically involves the integration of a Major Assembly Jig (MAJ) with various assembly machines and tooling, and which all must work in coordination.

There is an increasing desire to provide automation of assembly processes, such that an automated MAJ may operate in tandem with various automated assembly machines and robots. In this case, various data are passed to and from the MAJ and the automated machines to ensure safety and prevent damage. However, it can be important to check and debug the signals and interfaces between the various automation parts, particularly when assembly machines and MAJ are produced by different manufacturers.

SUMMARY OF THE INVENTION

A first aspect of the invention provides an emulator configured to emulate an automated aircraft assembly jig supporting an aircraft assembly, the emulator connectable to an automated equipment module and configured to: send a first signal to an automated equipment module, wherein the first signal is representative of a communication to the automated equipment module; and receive a second signal from the automated equipment module representative of a communication from the automated equipment module, wherein the automated equipment module is arranged to operate autonomously on an aircraft assembly.

An emulator able to mimic the electronic interfaces and responses of an automated aircraft assembly jig, thereby responding as though it were in the automated aircraft assembly jig itself, allows the interactions of the automated aircraft assembly jig with one or more automated equipment modules before the automated equipment modules operate on an automated aircraft assembly jig supporting an aircraft assembly. This provides more certainty to the operability of automated equipment modules before they are given access to work on an aircraft assembly. This can be particularly beneficial when the automated equipment modules are sourced from a different supplier to the automated aircraft assembly jig.

The first signal may include a signal indicating to the automated equipment module that the automated equipment module is connected to the emulator.

The second signal may include a signal indicating to the emulator that the emulator is connected to the automated equipment module.

The automated equipment module may be configured to perform an action based on the first signal. The second signal may indicate that the action has been performed.

The first signal may include a signal representative of an instruction to the automated equipment module to send a signal to the emulator to verify a secure connection between the automated equipment module and the emulator.

The second signal may include a signal from the automated equipment module verifying the secure connection between the automated equipment module and the emulator.

The first signal may include a signal representative of an instruction to acknowledge a movement of the automated aircraft assembly jig.

The second signal may include a signal acknowledging the movement of the automated aircraft assembly jig.

The first signal may include a signal representative of an instruction to move the automated equipment module with respect to the automated aircraft assembly jig.

The second signal may include a signal indicating that the automated equipment module has moved with respect to the automated aircraft assembly jig.

The movement of the automated aircraft assembly jig and/or the instruction to move the automated equipment module may include one or more of: moving a set distance; moving to a set destination; moving along a travel path; and moving at a set speed.

The first signal may include a signal representative of an instruction to stop movement of the automated equipment module.

The first signal includes a signal representative an entry through a perimeter of the automated aircraft assembly jig into part of the automated aircraft assembly jig.

The first signal may include a signal representative of an emergency stop command.

The second signal may indicate that the automated equipment module has stopped movement.

The first signal may include a signal requesting information regarding the automated equipment module.

The second signal may include a signal providing information regarding the automated equipment module.

The emulator may be connectable to a plurality of automated equipment modules and prior to sending the first signal the emulator is configured to: receive a preliminary signal from a first automated equipment module; and determine a communication to be sent to a second automated equipment module, wherein the first signal is representative of a communication to the automated equipment module and is based on the preliminary signal received from the first automated equipment module.

Validating the interaction of a plurality of automated equipment modules can be particularly beneficial, due to the added complexities in such a system.

The preliminary signal may indicate an emergency stop button on the first automated equipment module has been activated.

The preliminary signal may be representative of an intended movement of the first automated equipment module.

The emulator may be configured to emulate an automated aircraft assembly jig supporting an aircraft wing assembly.

According to a second aspect of the invention, there is provided an emulator system comprising the emulator of the first aspect and an automated equipment module, wherein, the emulator is configured to send the first signal to the automated equipment module; and wherein the automated equipment module is configured to send the second signal to the emulator.

The automated equipment module may be one or more of: a robot, a conveyor, a lifter, or a manipulator.

According to a third aspect of the invention, there is provided a method of validating an automated equipment module for connecting to an automated aircraft assembly jig, the method comprising: connecting the automated equipment module to an emulator, wherein the emulator is configured to emulate an automated aircraft assembly jig; adjusting a setting of the emulator, wherein the setting is representative of a setting of the automated aircraft assembly jig; sending a first signal from the emulator to the automated equipment module representative of a communication to the automated equipment module; and receiving a second signal at the emulator from the automated equipment module representative of a communication from the automated equipment module.

According to a further aspect of the invention, there is provided a method of operating an automated equipment module, comprising the method of validating an automated equipment module of the third aspect, and further comprising subsequently connecting the automated equipment module to an automated aircraft assembly jig.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
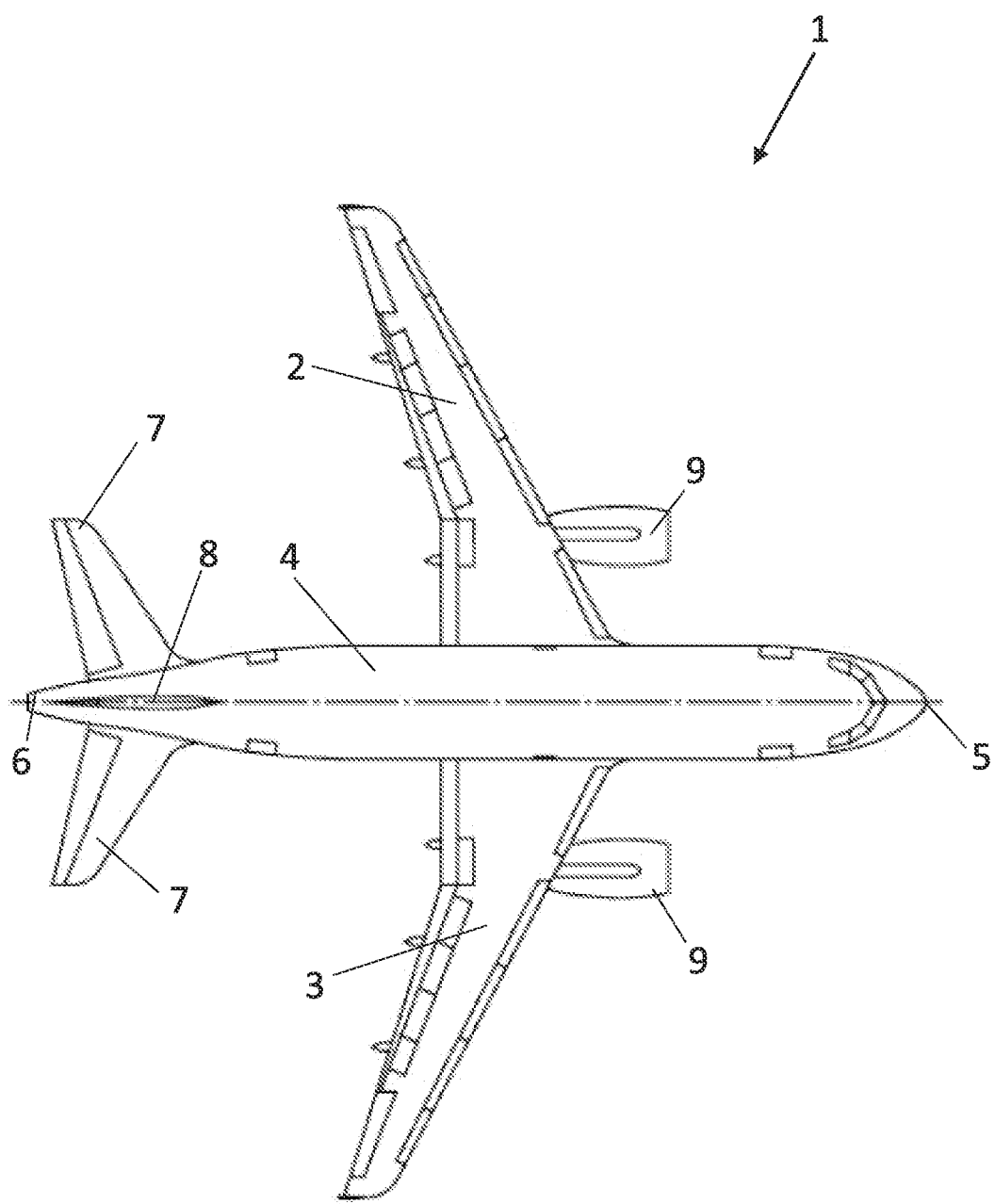
FIG. 1 shows a typical fixed wing aircraft.

FIG. 1 illustrates a typical fixed wing aircraft 1 having a port wing 2 and starboard wing 3 carrying wing mounted engines 9. The wings 2, 3 extend from a fuselage 4. The fuselage has a nose 5 and a tail 6 with an empennage including horizontal and vertical stabiliser surfaces 7, 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

The assembly of a large section of an aircraft structure, such as an aircraft wing 2,3, typically involves the integration of a Major Assembly Jig (MAJ) with various assembly machines and tooling, which must all work in coordination. There is an increasing desire to provide automation of assembly processes, such that an automated MAJ may operate in tandem with various automated assembly machines and robots.

Figure 2:
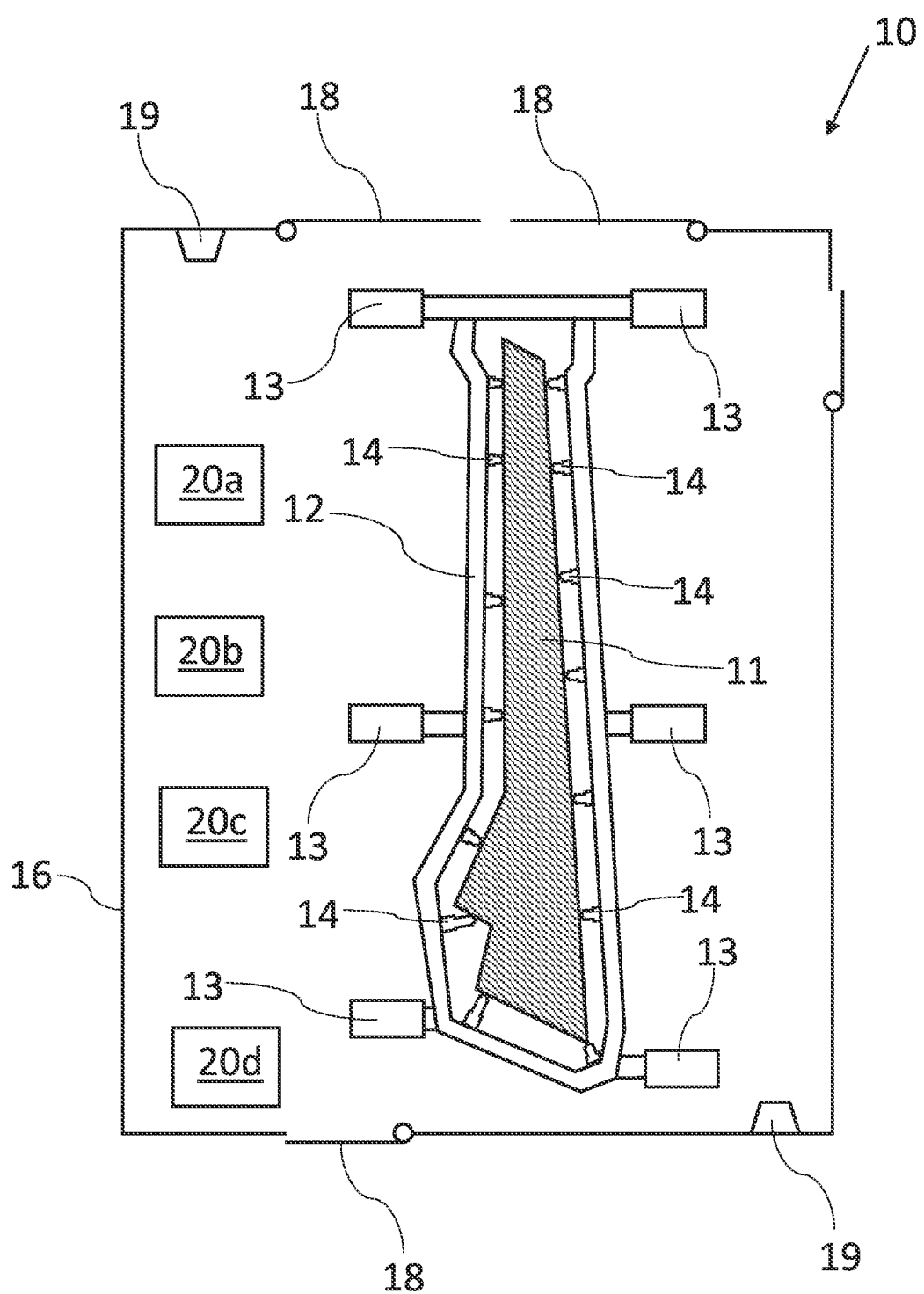
FIG. 2 shows an assembly station of an automated aircraft assembly jig.

FIG. 2 shows an automated Major Assembly Jig for fixing to an aircraft assembly 11 (i.e. an automated aircraft assembly jig 10). The automated assembly jig 10 may include a main frame 12 from which a plurality of stands 13 extend that assist in holding the aircraft assembly 11 in position. For example, the stands 13 may suspend the aircraft assembly 10 above the ground. The stands 13 may allow the main frame 12, and attached aircraft assembly 11, to move vertically or horizontally, as required.

In FIG. 2 the aircraft assembly 10 includes an aircraft wing 2,3 although it will be understood that the aircraft assembly 11 may be any suitable assembly, for example an empennage or fuselage 4 of an aircraft 1 or a combination thereof. The aircraft assembly 11 may be attached to the main frame 12 by one or more clamps 14 (only some of the clamps 14 are labelled in FIG. 2 to increase clarity).

The automated aircraft assembly jig 10 may include a perimeter 16 defining an assembly station and an outer boundary of the automated aircraft assembly jig 10. The perimeter 16 may include a physical barrier, such as a fence 16, that prevents access to or exit from the assembly station. The perimeter 16 may include one or more doors 18 that allow access into the assembly station.

The assembly station may include one or more automated equipment modules 20. The automated equipment module 20 is arranged to operate autonomously on the aircraft assembly 11.

FIG. 2 shows the assembly station including four automated equipment modules 20, although it will be understood that the assembly station may include any number of automated equipment modules 20.

Each automated equipment module 20 may be any suitable automated assembly machines or robots. The automated equipment modules 20 may be any suitable item of equipment arranged to work autonomously on the aircraft assembly 11 inside the assembly station, such as a robot 20a, a conveyor 20b, a lifter 20c, or a manipulator 20d.

The automated aircraft assembly jig 10 and automated equipment modules 20 all operate autonomously during assembly of the aircraft assembly 11, and must effectively communicate with each other in order to avoid collisions or other disruption to the assembly process. Various data is passed to and from the automated aircraft assembly jig 10 and each of the automated equipment modules 20. This helps to ensure the safety of personnel, as well as prevent damage to the aircraft assembly 11, the automated aircraft assembly jig 10, and each of the automated equipment modules 20.

Figure 3:
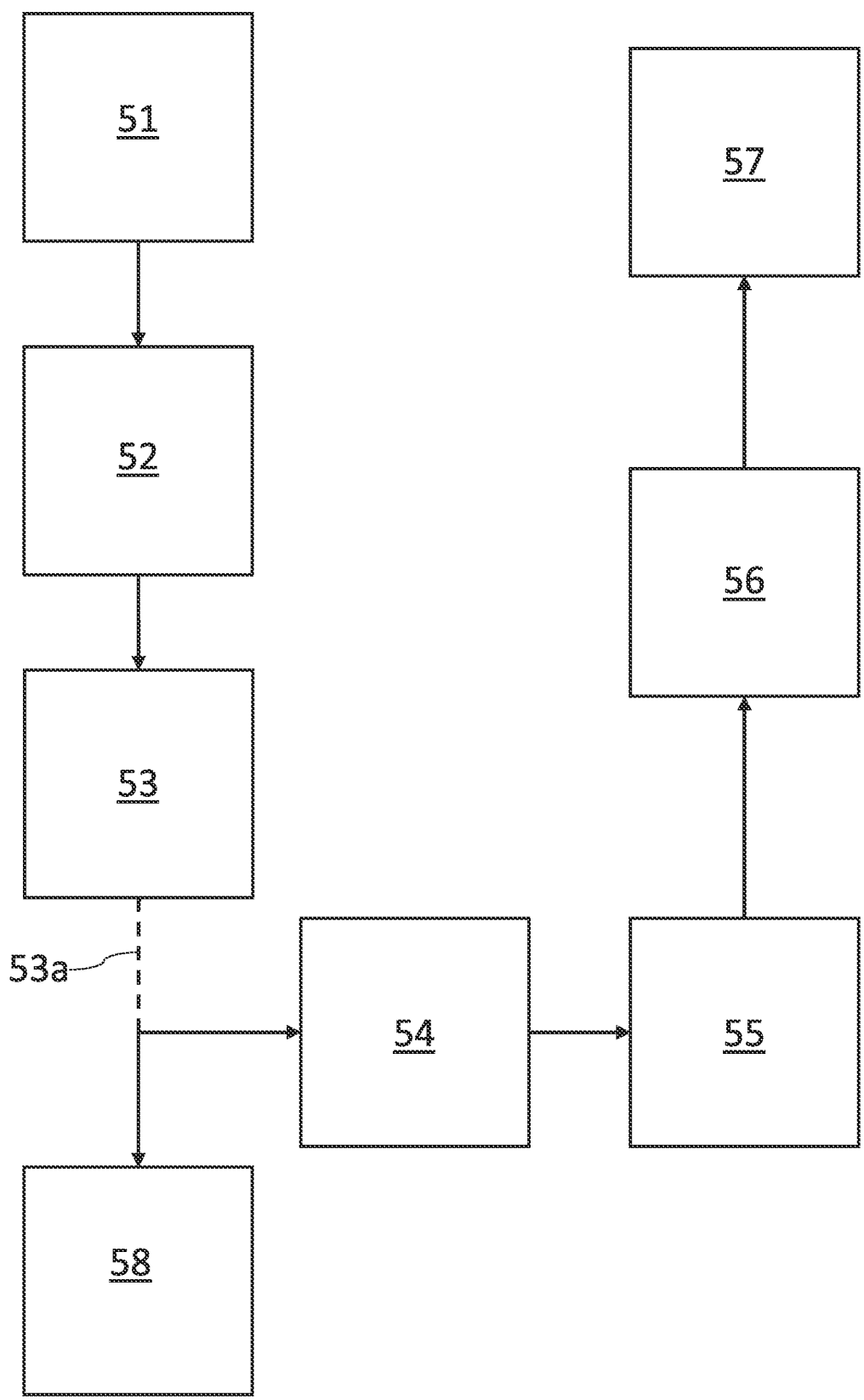
FIG. 3 shows a flow chart of an example interaction between an automated aircraft assembly jig and automated equipment modules.

FIG. 3 shows a flow chart illustrating one of many examples of the possible interactions between the automated aircraft assembly jig 10 and one or more automated equipment modules 20.

In a first step 51, a movement of the automated aircraft assembly jig 10 is selected. This movement may, for example, provide access to part of the aircraft assembly to an automated equipment module 20 or for inspection by assembly personnel.

The automated aircraft assembly jig 10 verifies that the assembly station is secure 52, and in particular that all access doors 18 are closed, and that no personnel are within the perimeter 16. One or more assembly station scanners 19 may also be located around and/or inside the assembly station to monitor the assembly station.

In a subsequent step 53, the automated aircraft assembly jig 10 sends a first signal to the automated equipment module(s) 20. The first signal comprises an instruction requesting each of the automated equipment module 20 to perform an action. The action may vary for each automated equipment module 20, for example the instruction may be to move, stop operations, or to confirm the intended actions of the automated equipment module 20 over a designated period of time.

The automated aircraft assembly jig 10 sends the first signal and waits a designated period of time 53a for the first signal to be received by the automated equipment module 20 and for the automated equipment module 20 to confirm receipt of the first signal.

The automated equipment module 20 receives the signal and verifies that the instruction has been received and if the instruction is actionable 54.

If the instruction is actionable, the automated equipment module 20 performs the action 55.

Upon completion of the action, in a subsequent step 56, the automated equipment module 20 sends a second signal that is received by the automated aircraft assembly jig 10. The second signal indicates that the first signal has been received by the automated equipment module 20 and that the instructed action has been performed.

Upon receipt of the second signal the automated aircraft assembly jig 10 moves to the selected position 57.

If, after sending the first signal, the automated aircraft assembly jig 10 fails to receive a confirmatory second signal from the automated equipment module 20 within the designated period of time 53a, the action is timed-out and the selected movement of the automated aircraft assembly jig 10 is cancelled 58.

It will be understood that the above example is only exemplary, and that the action could be any of a number of actions, as will become clear from the discussion below.

Due to the complex range of operations often required on an aircraft assembly 11, the automated equipment modules 20 are often sourced from different manufacturers to that of the automated aircraft assembly jig 10 and to each of the other automated equipment modules 20.

Even when a detailed specification of the interface signals is provided to the various manufacturer's, there remains some uncertainty due to the risk of bugs in the signals and interfaces. This can complicate and delay the setup of an automated aircraft assembly jig 10, as it is important to ensure that the automated aircraft assembly jig 10 and automated equipment modules 20 operate simultaneously and seamlessly. This can protect personnel, as well as protect the automated aircraft assembly jig 10, automated equipment modules 20, and aircraft assembly 11.

Figure 4:
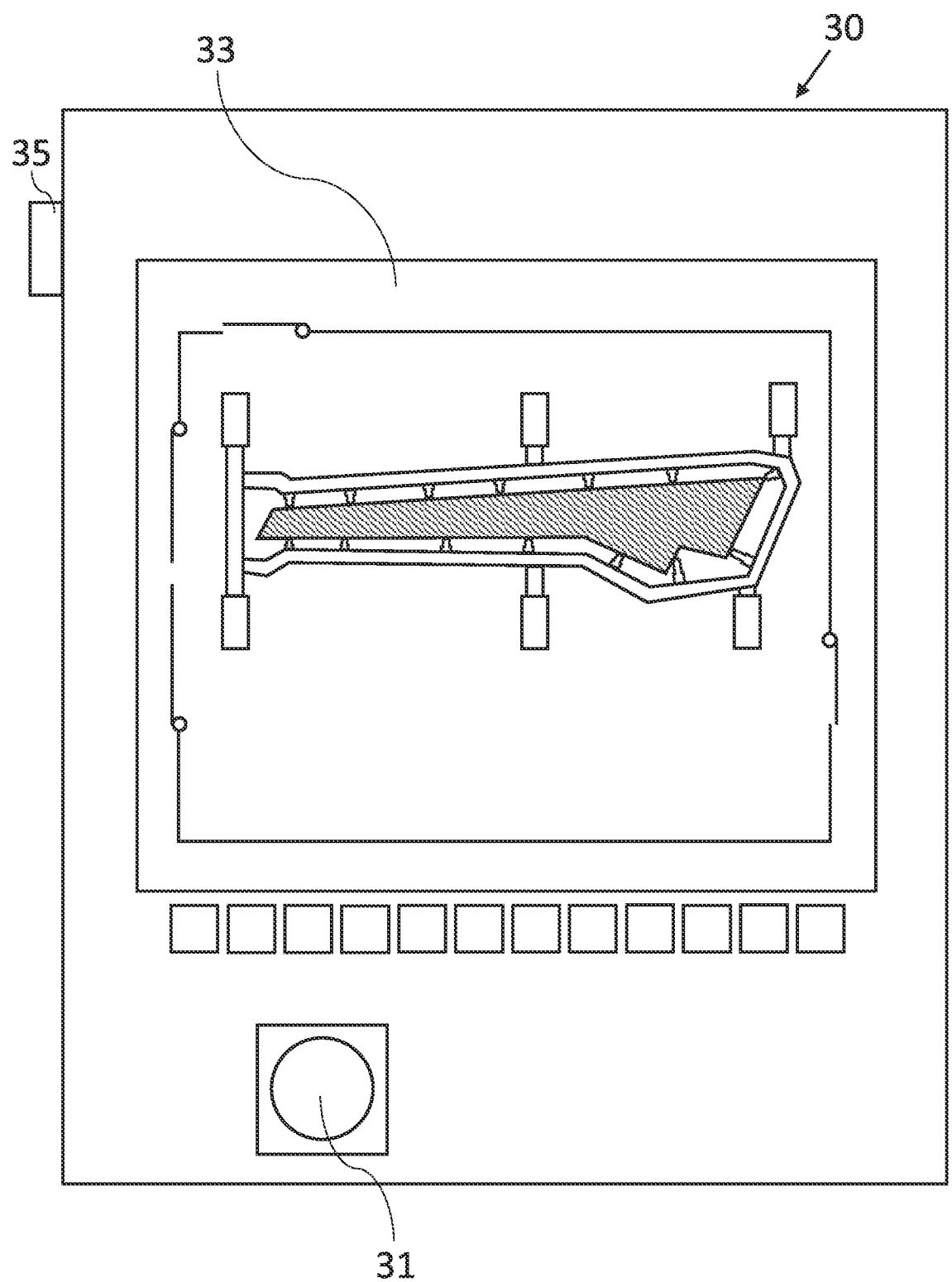
FIG. 4 an emulator for connecting to an automated equipment module.

FIG. 4 shows an example of an emulator 30 configured to emulate an automated aircraft assembly jig 10, such that the operations can be emulated in the absence of the automated aircraft assembly jig 10. In the following, it will be understood that references to emulator 30 and automated aircraft assembly jig 10 are used interchangeably unless indicated otherwise.

The emulator 30 may include various features for interacting with a user, such as an ON/OFF switch or button 31. The emulator 30 may include a screen 33, such as a touch screen, configured to display a graphical representation of the automated aircraft assembly jig 10 and/or information relating to the operation of the automated aircraft assembly jig 10.

The emulator 30 may show various information relating to the connection between the emulated automated aircraft assembly jig 10 and the automated equipment module(s) 20. For instance, the screen 33 may show a schematic (virtual) view of the automated aircraft assembly jig 10 and/or the automated equipment module(s) 20. The emulator 30 may indicate, e.g. show on the screen 33, the status of the emergency stop command or a perimeter status report.

The emulator 30 may include a reset function that is equivalent to a reset button on the automated aircraft assembly jig 10. The reset function may be used to rearm the system after a safety condition (e.g. emergency stop alarm triggered, or perimeter breached).

Figure 5:
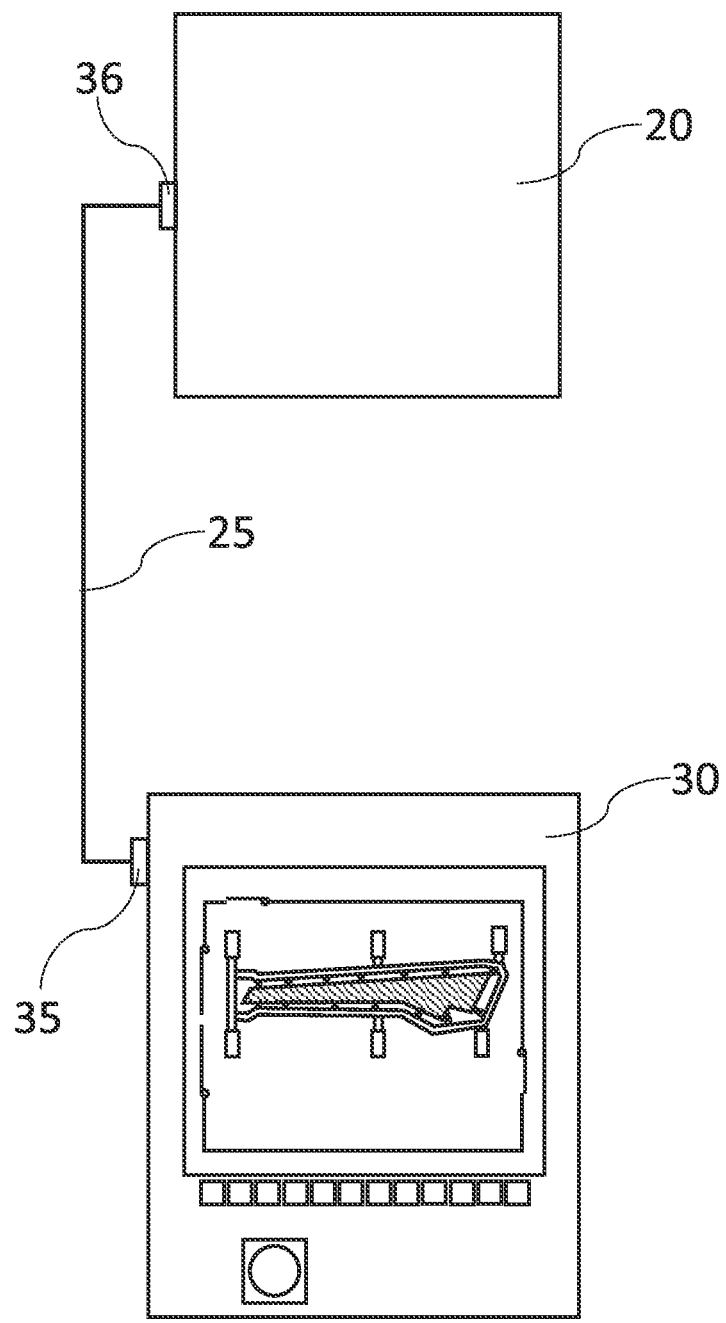
FIG. 5 shows an emulator connected to an automated equipment module.

The emulator 30 may include a connector 35, such as a Harting connector, through which a connection 25 (e.g. a data cable) can be made from the emulator 30 to a corresponding connector 36, such as a Harting connector, on an automated equipment module 20—as shown in FIG. 5.

The emulator 30 connects to each automated equipment module 20 using the same connector 35 (e.g. Harting connector) as the automated equipment modules 20 would connect to the actual (non-emulated) automated aircraft assembly jig 10. This ensures the connection emulates the physical connection between the automated aircraft assembly jig 10 and each automated equipment module 20 as realistically as possible.

Once both emulator 30 and automated equipment module 20 are powered up, various automated aircraft assembly jig 10 settings are adjusted, resulting in the signals being sent to the automated equipment module 20, allowing the automated equipment module 20 to respond according.

The signals may be compatible with the Profinet and/or Profisafe protocols. In other words, the signals may be adapted for transmission and receipt through the Profinet/Profisafe protocols. For example, the signal exchange may require connection via a Profinet/Profisafe connector so as to be compatible with the Profinet/Profisafe standard.

The connection may include a PN/PN coupler. A PN/PN coupler allows the connection of two Profinet/Profisafe networks, and transmission therebetween. The PN/PN coupler at each end of the connection may include a Profinet IO device that is connected to its own Profinet network.

Since the emulator 30 is intended to run as a simulator, all interactions with the automated equipment module 20 are performed through the interface of the emulator 30 (e.g. using the touch screen) without any other sensor or input device.

The emulator 30 may be configured to send a series of test signals to the automated equipment module 20 in order to verify that the connection with the automated equipment module 20 is fully functional, and that the automated equipment module(s) 20 responds as expected.

In some examples, the emulator 30 may be connected to two or more automated equipment modules 20 (e.g. three, four, or five). This may allow the automated equipment modules 20 to be tested more efficiently, and/or test the interaction of multiple independent automated equipment modules 20 prior to working on the (physical) automated aircraft assembly jig 10.

Figure 6:
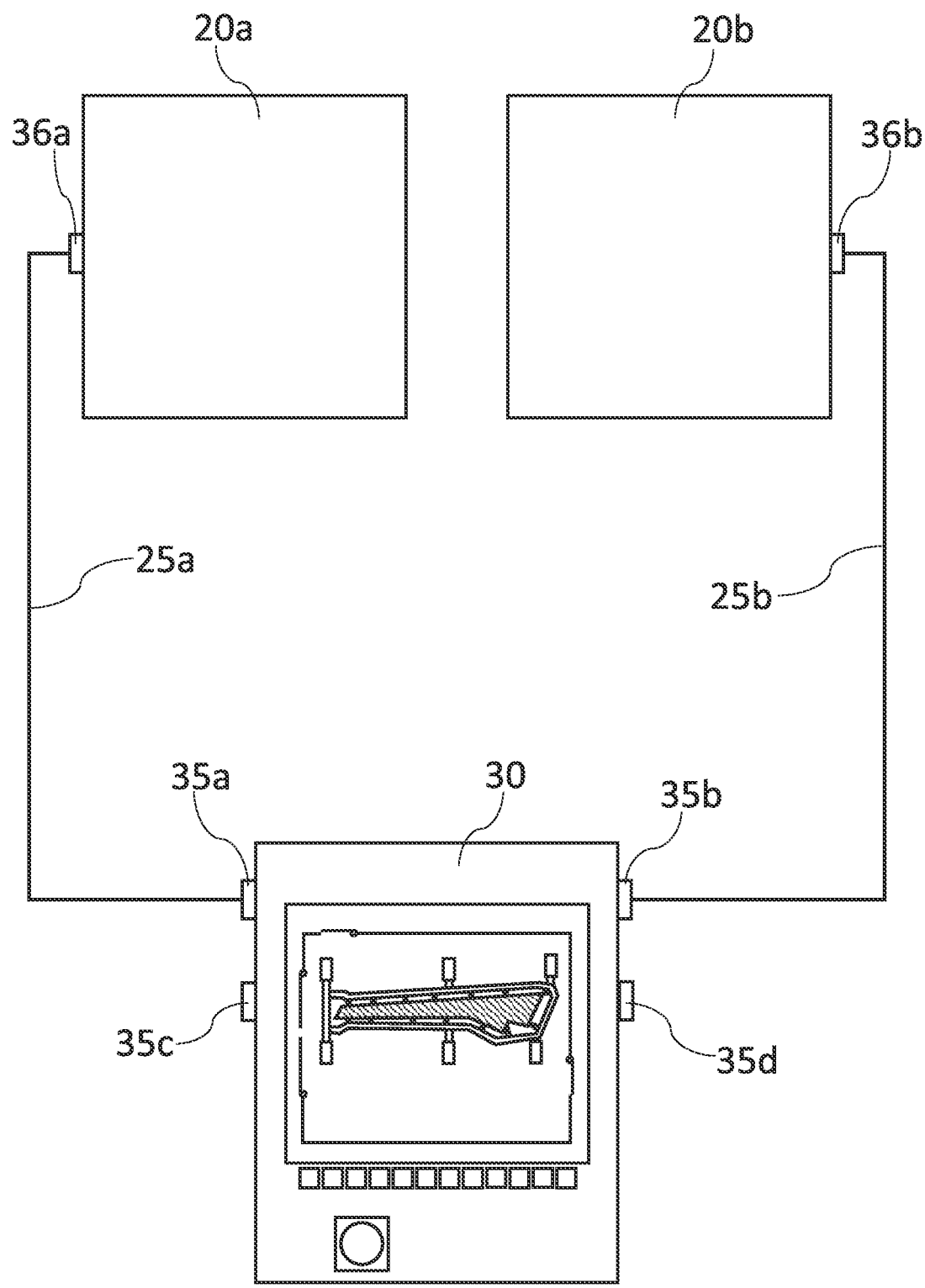
FIG. 6 shows an emulator connected to two automated equipment modules.

FIG. 6 shows an example in which the emulator 30 is connected to a first automated equipment module 20a and a second automated equipment module 20b. 36.

The emulator 30 includes a first connector 35a through which a connection 25a is made from the emulator 30 to a corresponding connector 36a on the first automated equipment module 20a. Similarly, the emulator 30 includes a second connector 35b through which a connection 25b is made from the emulator 30 to a corresponding connector 36b on the second automated equipment module 20b.

The emulator 30 may include any number of connectors 35 for connecting to automated equipment modules 20. For example, FIG. 6 shows the emulator 30 including four connectors 35a, 35b, 35c, 35d, two of which (i.e. connectors 35c, 35d) remain unused in this example but in alternative examples may be connected to a third and/or fourth automated equipment module 20.

The assembly station of the automated aircraft assembly jig 10 may include two or more work zones 37a, 37b. For example, the assembly station may include a (physical or virtual) fence 38 between two sections of the assembly station.

Figure 7:
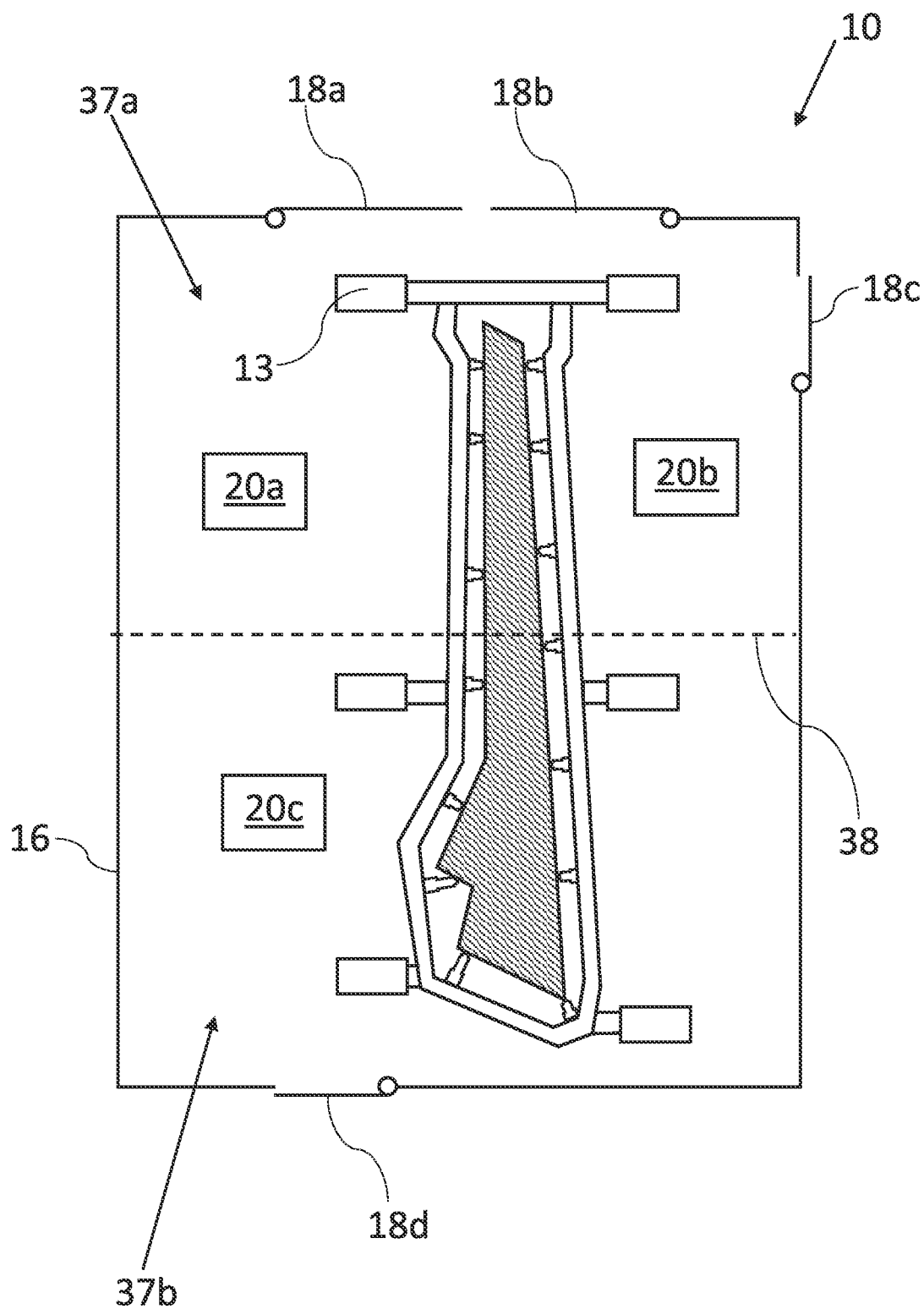
FIG. 7 shows an assembly station separated into two work zones.

FIG. 7 shows an example in which the assembly station is separated into a first work zone 37a and a second work zone 37b. The first work zone 37a includes two automated equipment modules 20a, 20b, whilst the second work zone 37b includes one automated equipment module 20c.

The automated equipment modules 20a, 20b, 20c and sections of the automated aircraft assembly jig 10 in those respective work zones 37a, 37b may be operable independently, such that automated equipment modules 20a, 20b in the first work zone 37a are able to continue operations whilst the automated equipment modules 20c in the second work zone 37b cease operations.

The separate and differing instructions to the automated equipment modules 20a, 20b in the first work zone 37a and the automated equipment modules 20c in the second work zone 37b may be based on any suitable parameter, as will be understood from discussion below of process and safety signals sent between the emulator 30 (emulating the automated aircraft assembly jig 10) and each automated equipment module 20. For example, an intrusion into a section of the perimeter 16 belonging to the first work zone 37a, and/or an opening of a door 18a, 18b, 18c of the first work zone 37a, may prompt an instruction to the automated equipment modules 20a, 20b in the first work zone 37a that is different to any instruction given to the automated equipment modules 20c in the second work zone 37b. Similarly, an intrusion into a section of the perimeter 16 belonging to the second work zone 37b, and/or an opening of a door 18d of the second work zone 37b, may prompt an instruction to the automated equipment modules 20c in the second work zone 37b that is different to any instruction given to the automated equipment modules 20a, 20b in the first work zone 37a.

Figure 8:
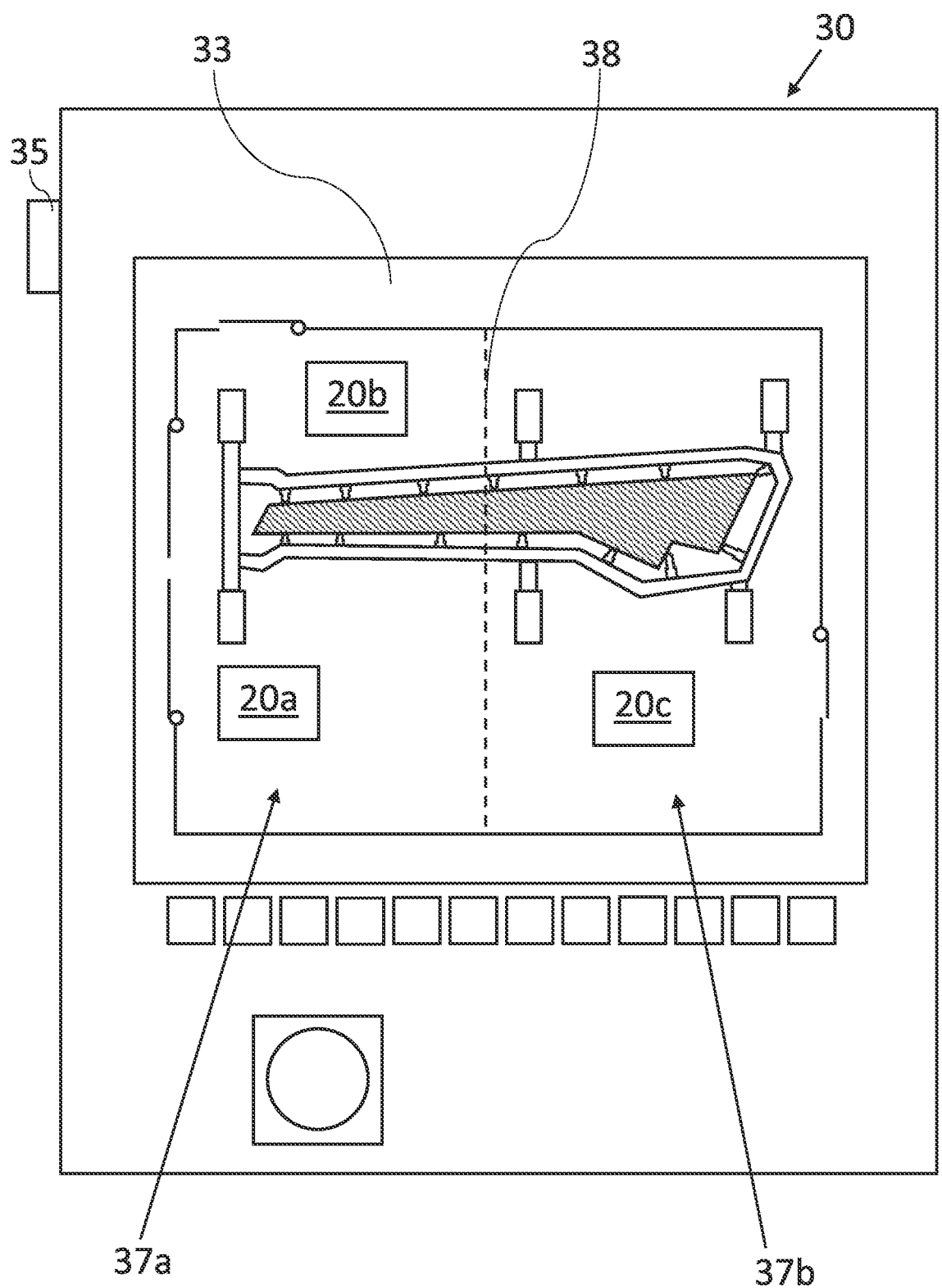
FIG. 8 shows an emulator displaying the two work zones.

FIG. 8 shows an example of the emulator 30 emulating the separation of the assembly station of the automated aircraft assembly jig 10 into these work zones 37a, 37b. The fence 38 may be shown on the screen 33 along with the automated aircraft assembly jig 10 and automated equipment modules 20a, 20b, 20c.

As shown in the previous figures, the emulator 30 may be connectable to one or more automated equipment modules 20. This allows two-way transmission between the emulator 30 and each automated equipment module 20 so that signals 60, 70 can be sent therebetween.

The emulator 30 is connected to the automated equipment module 20. The automated equipment module 20 is arranged to operate autonomously on an aircraft assembly.

Figure 9:
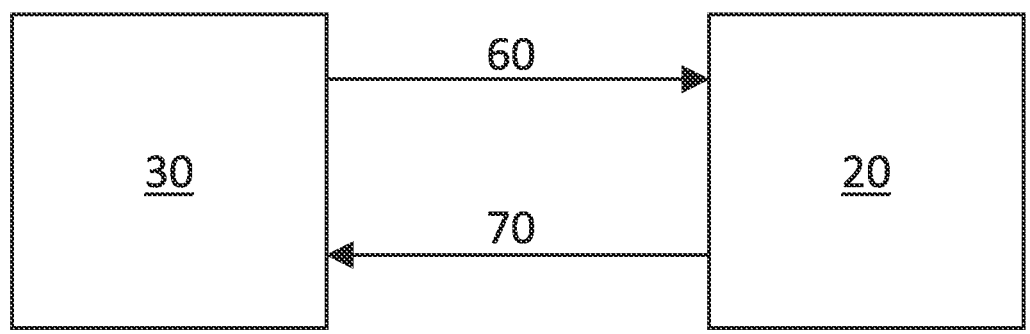
FIG. 9 shows an emulator and an automated equipment module exchanging signals.

As shown in FIG. 9, the emulator 30 sends a first signal 60 to the automated equipment module 20. This first signal 60 is representative of a communication to the automated equipment module 20.

Upon receiving the first signal 60, the automated equipment module 20 that is connected to the emulator 30 sends a second signal 70 to the emulator 30. The second signal 70 is received by the emulator 30. The second signal 70 is representative of a communication from the automated equipment module.

The first and second signals 60, 70 between the emulator 30 and the connected automated equipment module 20 may include any suitable communications that assist in establishing a reliable connection, and that both the automated aircraft assembly jig 10 and automated equipment module 20 would behave as expected if connected.

The first signal 60 may include a signal indicating to the automated equipment module 20 that the automated equipment module 20 is connected to the emulator 30, and the second signal 70 may include a signal indicating to the emulator 30 that the emulator 30 is connected to the automated equipment module 20.

This may involve the emulator 30 sending a continuous waveform (also referred to as a heartbeat signal) to the automated equipment module 20. The heartbeat signal may be sent continuously whilst a connection between the emulator 30 and the automated equipment module 20 exists, such that any disruption to the heartbeat signal represents a disruption to the connection between the emulator 30 and the automated equipment module 20. In some examples, the heartbeat signal may be a 2 Hz square waveform.

The automated equipment module 20 may be configured to perform an action based on the first signal 60. For example, the first signal 60 may contain an instruction for the automated equipment module 20. In this case, the second signal 70 may indicate that the action has been performed.

The first signal 60 may include a signal representative of an instruction to the automated equipment module 20 to send a signal to the emulator 30 to verify a secure connection between the automated equipment module 20 and the emulator 30. The second signal 70 may include a signal from the automated equipment module 20 verifying that there is a secure connection between the automated equipment module 20 and the emulator 30.

The secure signals may be sent using special functions to prevent the instructions of the signals from being directly accessed, such that a function sent by the emulator 30 or automated equipment module 20 must be paired with a corresponding function at the other of the emulator 30 or automated equipment module 20 to which the signal is sent. In some examples, the signal may not be sent until a connection between the emulator 30 and the automated equipment module 20 is verified by other (non-secure) means first, e.g. a heartbeat signal has been sent and received.

The first signal 60 may include a signal representative of an instruction to acknowledge a movement of the automated aircraft assembly jig 10. The movement of the automated aircraft assembly jig 10 may include moving the automated aircraft assembly jig 10 by a set distance (for example increasing or decreasing a height of the automated aircraft assembly jig 10), moving to a set destination, moving along a travel path (e.g. the travel path may be non-linear and/or involve more than one task), moving at a set speed, or any combination thereof. The movement may be movement of the entire automated aircraft assembly jig 10 or a part of the automated aircraft assembly jig 10. The second signal 70 from the automated equipment module 20 may include a signal acknowledging the movement of the automated aircraft assembly jig 10 detailed in the first signal 60.

In addition to acknowledging the movement of the automated aircraft assembly jig 10, the automated equipment module 20 may stop movement. Alternatively, the automated equipment module 20 may respond to the movement of the automated aircraft assembly jig 10 by moving. The movement of the automated equipment module 20 may include moving the automated equipment module 20 by a set distance, moving to a set destination, moving along a travel path, moving at a set speed, or any combination thereof. The movement of the automated equipment module 20 may alternatively or in addition include moving a part of the automated equipment module 20, for example a robot arm or a manipulator.

The movement of the automated equipment module 20 may be reported to the automated aircraft assembly jig 10. For example, the automated equipment module 20 may send information regarding the movement in the second signal 70 to the emulator 30.

Alternatively, or in addition, the first signal 60 may include a signal representative of an explicit instruction to move the automated equipment module 20 with respect to the automated aircraft assembly jig 10. In this case, the second signal 70 may include a signal indicating that the automated equipment module 20 has moved with respect to the automated aircraft assembly jig 10 as instructed by the automated aircraft assembly jig 10.

In some examples, the first signal 60 may include a signal representative of an instruction to stop movement of the automated equipment module 20. The second signal 70 may indicate that the automated equipment module 20 has stopped movement.

The instruction to stop movement of the automated equipment module 20 may be determined by the status of the perimeter 16. For example, an unauthorised entry through the perimeter 16 may trigger an alarm such that the first signal 60 instructs the automated equipment module 20 to stop all activity. The unauthorised entry may be caused by an operator or unauthorised machinery. This helps to ensure the safety of all operators, machinery, and the aircraft assembly 11.

Alternatively, or in addition, the instruction to stop movement of the automated equipment module 20 may be determined by an emergency stop command. The emergency stop command may be triggered by an operator or other personnel, inside or outside of the assembly station. For example, an emergency stop button or other interface may be triggered.

In some examples, the first signal 60 may include a signal requesting information regarding the automated equipment module 20. The signal may request information regarding the position and/or movement of the automated equipment module 20. This may relate to the current position and/or movement or an intended position and/or movement. The signal may request information to identify the automated equipment module 20 to the emulator 30 (for example: a unique ID code, name and/or model number). The second signal 70 may include a signal providing the requested information regarding the automated equipment module 20.

The first signal 60 may include a signal including an error code for transmission of error or diagnostic messages from the emulator 30 to the automated equipment module 20. This may assist the emulator 30 and automated equipment module 20 to mitigate the effects of the error, and/or to diagnose a problem. Similarly, the second signal 70 may include a signal including an error code for transmission of error or diagnostic messages from the automated equipment module 20 to the emulator 30.

The first signal 60 may indicate a request to enter the assembly station. For example, access may have been requested by an operator at a station access door 18. The second signal 70 may indicate whether to it is safe to accept the request for entry to the assembly station. This may involve the automated equipment module 20 stopping movement, or moving to a safe location, which may then also be sent to the emulator 30 in the first signal 60.

The first signal 60 may include a signal indicating to each connected automated equipment module 20 whether the assembly station is safe to work within. The conditions to be met may include but are not necessarily limited to: the perimeter being secure and armed, no personnel within the perimeter, no emergency stop commands triggered, each emergency stop button is armed, no assembly station scanners 19 are triggered, each assembly station scanner is armed. The conditions for safe working are typically considered from the perspective of the automated aircraft assembly jig 10. The second signal 70 may confirm receipt of the first signal 60 and/or request further information.

The first signal 60 may include a signal requesting confirmation from the automated aircraft assembly jig 10 whether an action is safe to perform. The action may be a movement of the automated aircraft assembly jig 10, an operator entering the assembly station, confirmation that an emergency stop command on the automated equipment module 20 has not been triggered, or the movement of a second automated equipment module 20.

The first signal 60 and/or second signal may include a signal requesting for a controlled disconnection between the automated equipment module 20 and the automated aircraft assembly jig 10.

It will be apparent from the above that the first and/or second signals 60, 70 may involve a plurality of signals.

In each of the above examples, the automated equipment module 20 receives the first signal 60 and acts upon the first signal 60 in the same way as it would do upon receiving the first signal 60 from an automated aircraft assembly jig 10 (as opposed to an emulator 30 emulating an automated aircraft assembly jig 10).

In this way, the emulator 30 is able to mimic the electronic interfaces and responses of an automated aircraft assembly jig 10, thereby responding as though it were in the automated aircraft assembly jig 10 itself. In this way, the emulator 30 tests the interaction with automated equipment modules 20 before they operate on a real-life aircraft assembly 11 that is being supported by the automated aircraft assembly jig 10.

It will be appreciated that the automated aircraft assembly jig 10 will typically be connected to a plurality of automated equipment modules 20. It may therefore be necessary to emulate the interaction of multiple automated equipment modules 20.

Figure 10:
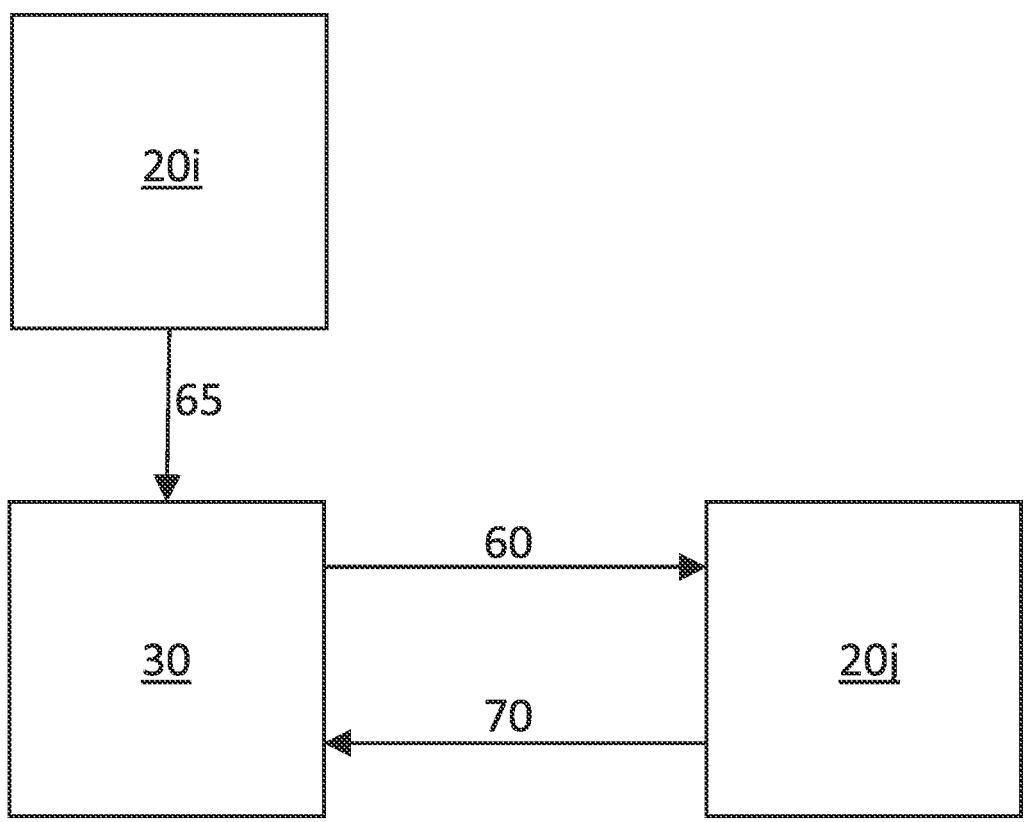
FIG. 10 shows an emulator communicating with two automated equipment modules.

FIG. 10 shows an example in which a first automated equipment module 20*i* and a second automated equipment module 20*j* are both connected to an emulator 30.

In this example, the first automated equipment module 20*i* sends a preliminary signal 65 to the emulator 30. The emulator 30 receives the preliminary signal 65 and, based on the preliminary instruction, determines a communication to be sent to the second automated equipment module 20*j*. This communication may be the first signal 60, referred to in the above examples, and be based on the preliminary signal received from the first automated equipment module 20*i*.

For example, the first signal 60 may indicate a position or movement of the first automated equipment module 20*i*, or instruct the second automated equipment module 20*j* to stop movement. The preliminary signal 65 may indicate an emergency stop button on the first automated equipment module 20*i* has been activated.

Emulation of an automated aircraft assembly jig 10 may be particularly beneficial when there will be many different automated equipment modules 20 working independently on the aircraft assembly 11, and which must work in cooperation with the automated aircraft assembly jig 10 and other automated equipment modules 20.

An emulator 30 according to the present invention can save valuable time in validating the operation of the automated aircraft assembly jig 10 in combination with any number of automated equipment modules 20, particularly when the automated equipment modules 20 may be developed by different suppliers and therefore operate on different source code. The emulator 30 can be used by the supplier to validate the behaviour of the automated equipment module 20 prior to dispatch for work on the aircraft assembly 11.

This allows a high degree of confidence in the robustness of the all the control related interfaces prior to use.

In order to validate the operation of an automated equipment module 20 for connecting to an automated aircraft assembly jig 10, the emulator 30 may be connected to the automated equipment module 20 so that communications can be sent between the emulator 30 and the automated equipment module 20.

A setting of the emulator 30 may then be adjusted, with that setting being representative of a setting of the automated aircraft assembly jig 10 (e.g. a change in height).

The emulator 30 may then send a first signal 60 to the automated equipment module 20 representative of a communication to the automated equipment module 20.

The first signal 60 is then received by the automated equipment module 20, and a second signal 70 is sent from the automated equipment module 20 to the emulator 30 that is representative of a communication from the automated equipment module 20.

Upon validation of the automated equipment module 20, or two or more automated equipment modules 20 in combination, the automated equipment module(s) 20 may then subsequently be disconnected from the emulator 30 and connected to an automated aircraft assembly jig.

Whilst the invention has been described in the context of an automated aircraft assembly jig 10 supporting an aircraft wing assembly, it will be appreciated that the invention may also be particularly useful in the assembly of other large aircraft structures, for example the fuselage 4 or empennage 6,7, or combinations thereof.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An automated aircraft assembly emulator system, comprising:
   an automated equipment module;
   an emulator configured to emulate an automated aircraft assembly jig supporting an aircraft assembly, wherein the emulator is configured to test the interaction of the automated equipment module with the automated aircraft assembly jig prior to the automated equipment module operating on a real-life aircraft assembly, the emulator connectable to the automated equipment module and configured to:
   send a first signal to the automated equipment module, wherein the first signal is representative of a communication to the automated equipment module to perform an action; and
   receive a second signal from the automated equipment module representative of a communication from the automated equipment module,
   wherein the automated equipment module is arranged to operate autonomously on an aircraft assembly; and
   wherein,
   the emulator is configured to send the first signal to the automated equipment module.

2. An automated aircraft assembly emulator system, comprising:
   an automated equipment module;
   an emulator configured to emulate an automated aircraft assembly jig supporting an aircraft assembly, wherein the automated equipment module is configured to connect to the automated aircraft assembly jig using a connector, wherein the emulator is configured to connect to the automated equipment module using the connector and further configured to:
   send a first signal to the automated equipment module, wherein the first signal is representative of a communication to the automated equipment module to perform an action; and
   receive a second signal from the automated equipment module representative of a communication from the automated equipment module,
   wherein the automated equipment module is arranged to operate autonomously on an aircraft assembly; and
   wherein,
   the emulator is configured to send the first signal to the automated equipment module.

3. The emulator system of claim 2, wherein the first signal includes a signal indicating to the automated equipment module that the automated equipment module is connected to the emulator.

4. The emulator system of claim 3, wherein the second signal includes a signal indicating to the emulator that the emulator is connected to the automated equipment module.

5. The emulator system of claim 2, wherein the automated equipment module is configured to perform an action based on the first signal; and wherein the second signal indicates that the action has been performed.

6. The emulator system of claim 2, wherein the first signal includes a signal representative of an instruction to move the automated equipment module with respect to the automated aircraft assembly jig.

7. The emulator system of claim 2, wherein the first signal includes a signal representative of an instruction to stop movement of the automated equipment module.

8. The emulator system of claim 2, wherein the first signal includes a signal representative an entry through a perimeter of the automated aircraft assembly jig into part of the automated aircraft assembly jig.

9. The emulator system of claim 2, wherein the first signal includes a signal representative of an emergency stop command.

10. The emulator system of claim 2, wherein the second signal indicates that the automated equipment module has stopped movement.

11. The emulator system of claim 2, wherein the first signal includes a signal requesting information regarding the automated equipment module.

12. The emulator system of claim 2, wherein the emulator has an adjustable emulator setting, the emulator setting is representative of a setting of the automated aircraft assembly jig, and wherein the emulator is configured to send the first signal in response to adjustment of the emulator setting.

13. The emulator system of claim 2, wherein the automated equipment module is configured to send the second signal to the emulator.

14. The emulator system of claim 2, wherein the first signal includes a signal representative of an instruction to the automated equipment module to send a signal to the emulator to verify a secure connection between the automated equipment module and the emulator.

15. The emulator system of claim 14, wherein the second signal includes a signal from the automated equipment module verifying the secure connection between the automated equipment module and the emulator.

16. The emulator system of claim 2, wherein the first signal includes a signal representative of an instruction to acknowledge a movement of the automated aircraft assembly jig.

17. The emulator system of claim 16, wherein the second signal includes a signal acknowledging the movement of the automated aircraft assembly jig.

18. The emulator system of claim 16, wherein the second signal includes a signal indicating that the automated equipment module has moved with respect to the automated aircraft assembly jig.

19. The emulator system of claim 2, wherein the emulator is connectable to a plurality of automated equipment modules and prior to sending the first signal the emulator is configured to:
receive a preliminary signal from a first automated equipment module; and
determine a communication to be sent to a second automated equipment module, wherein the first signal is representative of a communication to the automated equipment module and is based on the preliminary signal received from the first automated equipment module.

20. The emulator system of claim 19, wherein the preliminary signal indicates an emergency stop button on the first automated equipment module has been activated.

21. The emulator system of claim 19, wherein the preliminary signal is representative of an intended movement of the first automated equipment module.

* * * * *